(12) United States Patent
Bederna et al.

(10) Patent No.: US 9,315,074 B2
(45) Date of Patent: Apr. 19, 2016

(54) PNEUMATIC VEHICLE TYRE

(75) Inventors: Christoph Bederna, Barsinghausen (DE); Maike Schulte, Hannover (DE); Theresia Becker, Duesseldorf (DE)

(73) Assignee: CONTINENTAL REIFEN DEUTSCHLAND GMBH, Hannover (DE)

( * ) Notice: Subject to any disclaimer, the term of this patent is extended or adjusted under 35 U.S.C. 154(b) by 430 days.

(21) Appl. No.: 13/580,830

(22) PCT Filed: Feb. 15, 2011

(86) PCT No.: PCT/EP2011/052161
§ 371 (c)(1), (2), (4) Date: Aug. 23, 2012

(87) PCT Pub. No.: WO2011/131383
PCT Pub. Date: Oct. 27, 2011

(65) Prior Publication Data
US 2012/0318426 A1 Dec. 20, 2012

(30) Foreign Application Priority Data
Apr. 21, 2010 (DE) .......................... 10 2010 016 569

(51) Int. Cl.
*B60C 9/22* (2006.01)
*B60C 9/20* (2006.01)

(52) U.S. Cl.
CPC ................ *B60C 9/2006* (2013.04); *B60C 9/20* (2013.01); *B60C 9/22* (2013.01); *B60C 2009/208* (2013.04);
(Continued)

(58) Field of Classification Search
CPC .......... B60C 9/22; B60C 9/20; B60C 9/2006; B60C 2009/2012; B60C 2009/2074; B60C 2009/208; B60C 2009/2214; Y10T 152/10783

USPC .................................. 152/531, 533, 527, 534
See application file for complete search history.

(56) References Cited

U.S. PATENT DOCUMENTS 4,194,548 A * 3/1980 Roger ........................ B60C 9/20
5,078,191 A * 1/1992 Tamura ..................... B60C 9/20
(Continued)

FOREIGN PATENT DOCUMENTS

EP 0 675 223 10/1995
EP 1 067 236 1/2001
(Continued)

OTHER PUBLICATIONS

"Tire Cord", Kirk-Othmer Encyclopedia of Chemical Technology, $4^{th}$ ed., vol. 24, John Wiley & Sons, Inc., 1997, pp. 169-170.*
(Continued)

*Primary Examiner* — Adrienne C Johnstone
(74) *Attorney, Agent, or Firm* — Greenblum & Bernstein, P.L.C.

(57) ABSTRACT

Vehicle pneumatic tire with belt and carcass. An inner working ply of the belt has first parallel steel strengtheners embedded in rubber oriented at an angle "α" relative to a circumferential direction and satisfy: $10°≤α≤45°$. An outer working ply of the belt has second parallel steel strengtheners embedded in rubber oriented at an angle "γ" and satisfy: $10°≤γ≤45°$. The inner working ply has a greater axial length. The angles "α" and "γ" have opposite inclination. Another belt ply is arranged between the inner and outer working plies and has third parallel strengtheners embedded in rubber oriented at an angle "β" and satisfy: $0°≤β≤5°$. The first and second strengtheners have a breaking force F greater than 1800 N and at 10% of the breaking force F, an extension D satisfies $0.22\%≤D≤0.4\%$.

20 Claims, 6 Drawing Sheets

(52) U.S. Cl.
CPC . *B60C 2009/2012* (2013.04); *B60C 2009/2074* (2013.04); *B60C 2009/2214* (2013.04); *B60C 2200/06* (2013.04)

(56) References Cited

U.S. PATENT DOCUMENTS

| 5,772,810 | A  | * | 6/1998 | Cluzel ............................ 152/531 |
| 6,442,922 | B1 |   | 9/2002 | Han |
| 2005/0028511 | A1 |   | 2/2005 | Shon et al. |
| 2010/0154958 | A1 |   | 6/2010 | Nicolas et al. |

FOREIGN PATENT DOCUMENTS

| EP | 1 795 371 |   | 6/2007 |
| EP | 1 886 843 |   | 2/2008 |
| EP | 2 199 104 |   | 6/2010 |
| GB | 1 487 426 | * | 9/1977 |

OTHER PUBLICATIONS

PCT/ISA/210 for PCT/EP11/52161, Mar. 23, 2011.*

* cited by examiner

PNEUMATIC VEHICLE TYRE

CROSS-REFERENCE TO RELATED APPLICATIONS

The present application is a U.S. National Stage of International Patent Application No. PCT/EP2011/052161 filed Feb. 15, 2011 which published as WO 2011/131383 on Oct. 27, 2011, and claims priority of German Patent Application No. 10 2010 016 569.7 filed Apr. 21, 2010.

BACKGROUND OF THE INVENTION

1. Field of the Invention

The invention relates to a vehicle pneumatic tire, in particular for utility vehicles, with a carcass, with a belt built on radially outside the carcass, and with a profiled running strip built on the belt radially outside the belt, the belt being formed from at least three belt plies arranged so as to lie one on the other radially from the inside radially outward, the radially inner and the radially outer belt ply being working plies with parallel steel strengtheners embedded in rubber, the strengtheners of the radially inner working ply forming in their orientation an angle $\alpha$ to the circumferential direction U of $10°\le\alpha\le45°$, and the strengtheners of the radially outer working ply forming an angle $\gamma$ to the circumferential direction U of $10°\le\gamma\le45°$, and, as seen in the circumferential direction U of the vehicle tire, the strengtheners of one working ply having an opposite axial inclination direction to the strengtheners of the other working ply, and the belt ply arranged between these two working plies being a belt ply designed as zero-degree ply and having parallel strengtheners which are embedded in rubber and which form in their orientation an angle $\beta$ to the circumferential direction U of $0°\le\beta\le5°$.

2. Discussion of Background Information

Conventional utility vehicle pneumatic tires usually have a four-ply belt with what is known as a triangular configuration, in which two working plies are arranged one on the other in the radial direction and their steel cords have in each case an approximately 15° to 30° to the circumferential direction, the steel cords of one working ply and those of the second working ply being inclined in a different axial direction A. The working plies thereby form a crossbracing. In belts of this type, beneath the working plies a belt ply is usually located which is designed as a blocking ply and the steel cords of which have an angle of 45° to 60° to the circumferential direction, with the result that the cords of the working plies and of the blocking ply form a triangular bracing. In addition, above the two working plies is usually formed an additional protective ply which forms the fourth belt ply and the steel cords of which likewise have an angle of approximately 15° to 30° to the circumferential direction of the vehicle tire. Belts of this type have restricted circumferential rigidity. The movability of the belt margins which is thereby made possible may have an adverse effect upon the durability of the tire. Furthermore, the belt may experience radial expansions during operation. This growth may lead to excessive and uneven abrasion of the tire.

It is also known to design utility vehicle pneumatic tires with a four-ply arrangement, with a radially inner blocking ply having steel cords which form an angle of approximately 45° to 65° to the circumferential direction, with two working plies which are formed above the blocking ply and conventionally form a crossbracing of their steel cords, with an orientation of the steel cords of approximately 15° to 30° in each case, and with a fourth belt ply which is formed on the outer working ply radially outside the two working plies and which is designed as what is known as a 0° ply, its strengtheners made from steel cords being oriented essentially in a circumferential direction with an angle of 0° to 2.5° to the circumferential direction. In such constructions, the circumferential rigidity of the belt is increased, this having a positive effect upon the durability of the belt. However, the influence of the 0° ply is restricted essentially to the radially outer working ply. However, the inner working ply is designed with residual movability, again having adverse influences upon durability and abrasion.

Furthermore, occasionally, a design of a utility vehicle pneumatic tire with a belt arrangement in which a 0° ply is formed radially between the two working plies has been proposed. In these proposed designs, the two working plies are still forming with crossbracing and their steel cords are oriented in each case at angles of approximately 18° to the circumferential direction. This design, admittedly, makes it possible to have high circumferential rigidity and, as compared with a conventional utility vehicle pneumatic tire, improved durability and an improved abrasion pattern. The steel cords of these known working plies are usually steel cords of the type 3×0.20+6×0.35 NT. So that these steel cords, which have a breaking force F of 1700 N and an extension under 10% of the breaking force of less than 0.15%, acquire sufficient puncture resistance, a multiplicity of steel cords of a relatively thin cross section are formed in a high arrangement density in the working plies. Steel cords with a large cross-sectional thickness, which would be beneficial to belt durability, can therefore be used to only a limited extent. Even if they were used, the high arrangement density necessary to limit the puncture risk would entail a high belt ply weight, large quantities of material and an adverse influence upon abrasion.

SUMMARY OF THE INVENTION

The invention therefore provides a vehicle pneumatic tire of this type, in particular for utility vehicles, having at least three belt plies, in which improved puncture resistance is made possible in a simple way, along with a good abrasion behavior and high durability.

The invention aims to design a vehicle pneumatic tire, in particular for utility vehicles, with a carcass, with a belt built on radially outside the carcass, and with a profiled running strip built on the belt radially outside the belt, the belt being formed from at least three belt plies arranged so as to lie one on the other radially from the inside radially outward, the radially inner and radially outer belt ply being working plies with parallel steel strengtheners embedded in rubber, the strengtheners of the radially inner working ply forming in their orientation an angle $\alpha$ to the circumferential direction U of $10°\le\alpha\le45°$ and the strengtheners of the radially outer working ply forming an angle $\gamma$ to the circumferential direction U of $10°\le\gamma\le45°$, and, as seen in the circumferential direction U of the vehicle tire, the strengtheners of one working ply having an opposite axial inclination direction to the strengtheners of the other working ply, and the belt ply arranged between these two working plies being a belt ply designed as a zero-degree ply and having parallel strengtheners which are embedded in rubber and which form in their orientation an angle $\beta$ to the circumferential direction U of $0°\le\beta\le5°$, according to the features described herein in which the strengtheners of the two working plies have in each case a breaking force F of F>1800 N and, under 10% of the breaking force, an extension D of $0.22\%\le D\le0.4\%$.

By virtue of this design, it becomes possible to profit from the advantage of a high circumferential rigidity of the belt via the 0° ply, in the position of the latter decoupling the two working plies, between said two working plies, which directly influences both working plies, with the result that the belt ply margins are obstructed in each case in their movability and also the belt growth is counteracted in the region, critical for this purpose, between the belt center and the belt margins. The strengtheners of the working plies make it possible, by virtue of their high breaking force and extension, to have an increased puncture resistance of the working plies and high durability, along with good abrasion. Even in the case of relatively thick cross sections of a low arrangement density of the strengtheners, the strengtheners make it possible to have high puncture resistance, as a result of which, with a relatively low belt ply weight and material consumption, high puncture resistance and durability can be implemented, along with an abrasion behavior benefitting from this even further.

The design of a vehicle pneumatic tire according to the features described herein is especially advantageous, the strengtheners of the two working plies having in each case a breaking force F of F>2500 N. Optimal puncture resistance against cord breaks is thereby made possible.

The design of a vehicle pneumatic tire according to the features described herein is especially advantageous, the strengtheners of the two working plies having in each case, under 10% of the breaking force, an extension D of $0.28\% \leq D \leq 0.32\%$. The extension also allows the movement of relatively small stones, along with sufficiently high shear resistance, for optimized abrasion behavior.

The design of a vehicle pneumatic tire according to the features described herein is especially advantageous, a further belt ply with parallel strengtheners embedded in rubber being formed radially outside the radially outer working ply on the outer working ply, since protection against puncture can be further increased by the additional outer belt ply.

The design of a vehicle pneumatic tire according to the features described herein is especially advantageous, the further belt ply being designed as a zero-degree ply, the strengtheners of which form in their orientation an angle δ to the circumferential direction U of the vehicle pneumatic tire of $0° \leq \delta \leq 5°$, since the circumferential forces are thereby distributed decisively to two belt plies. As a result, even if excessive loads may possibly arise when the tire is in use, cord breaks can additionally be counteracted.

The design of a vehicle pneumatic tire according to the features described herein is especially advantageous, the strengtheners of the additional belt ply forming in their orientation an angle δ to the circumferential direction U of the vehicle pneumatic tire of $10° \leq \delta \leq 90°$, in particular of $15° \leq \delta \leq 45°$. The shear resistance thereby achieved has a positive effect upon the achievement of a uniform abrasion pattern, along with additional protection against the penetration of stones.

The design of a vehicle pneumatic tire according to the features described herein is especially advantageous, there being formed radially within the radially inner working ply, between the carcass and the radially inner working ply, a further belt ply with parallel strengtheners embedded in rubber, the strengtheners of which form in their orientation an angle ε to the circumferential direction U of the vehicle pneumatic tire of, in particular $45° \leq \epsilon \leq 90°$, because the additional blocking ply formed affords an optimal force flux from the carcass into the belt formed from the belt plies, and moreover reduces the movement of the working plies and therefore further improves durability.

The design of a vehicle pneumatic tire according to the features described herein is especially advantageous, the zero-degree ply arranged radially between the two working plies being designed in its axial extent in the vehicle pneumatic tire to be, in particular, at least 10 mm smaller than each of the two working plies, since increased durability of the zero-degree ply is thereby made possible.

The design of a vehicle pneumatic tire according to the features described herein is especially advantageous, the zero-degree ply ending, on both axial sides, within the axial range of extent of each of the two working plies, with the result that the movability of the edges of the zero-degree ply can be further restricted and the durability of the belt can be further improved.

The design of a vehicle pneumatic tire according to the features described herein is especially advantageous, the radially outer of the two working plies being designed in its axial extent in the vehicle pneumatic tire to be smaller than the radially inner of the two working plies, in particular the radially outer of the two working plies ending, on both axial sides, within the axial range of extent of the radially inner of the two working plies. The situation can therefore be avoided where the outer working ply is exposed to high movement in the region of the shoulders. Durability can thus be further improved.

The design of a vehicle pneumatic tire according to the features described herein is especially advantageous, the strengtheners of the zero-degree ply or zero-degree plies being strengtheners made from steel. This is beneficial further to high circumferential rigidity, good durability and uniform abrasion.

The design of a vehicle pneumatic tire according to the features described herein is especially advantageous, the strengtheners at least of the zero-degree ply arranged between the working plies being high-elongation cords. The elevation of the belt in the build-up process can thereby be made possible in a simple way.

The design of a vehicle pneumatic tire according to the features described herein is especially advantageous, the strengtheners of the additional belt ply being strengtheners made from steel, since good protection against puncture is thereby promoted in a simple way.

BRIEF DESCRIPTION OF THE DRAWINGS

The invention is explained below by way of the exemplary embodiments, illustrated in FIG. 1 to FIG. 6 of a utility vehicle pneumatic tire of a radial type of construction wherein.

DETAILED DESCRIPTION OF THE INVENTION

Figure 1:
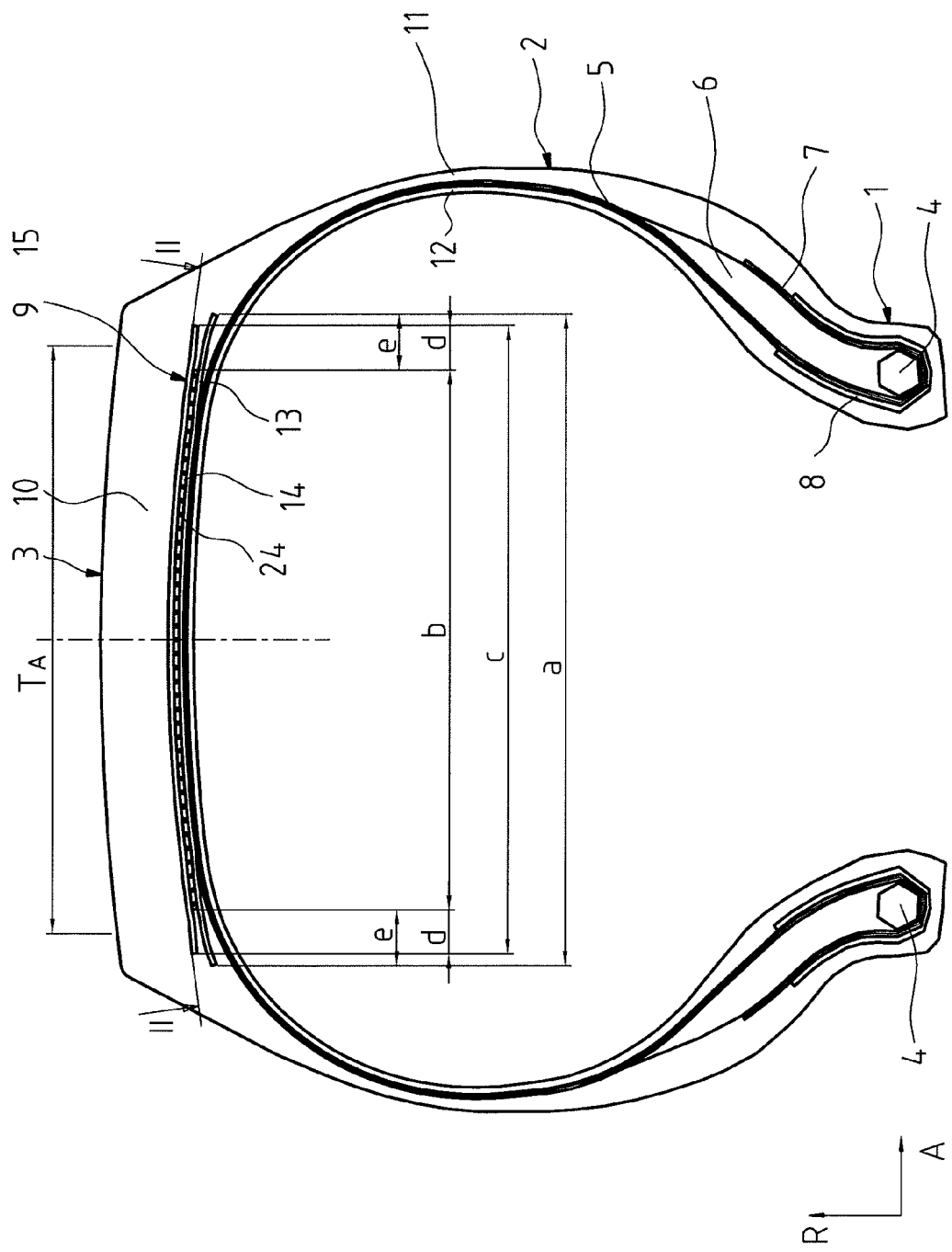
FIG. 1 shows a cross-sectional illustration of a vehicle pneumatic tire for utility vehicles of a radial type of construction.
Figure 2:
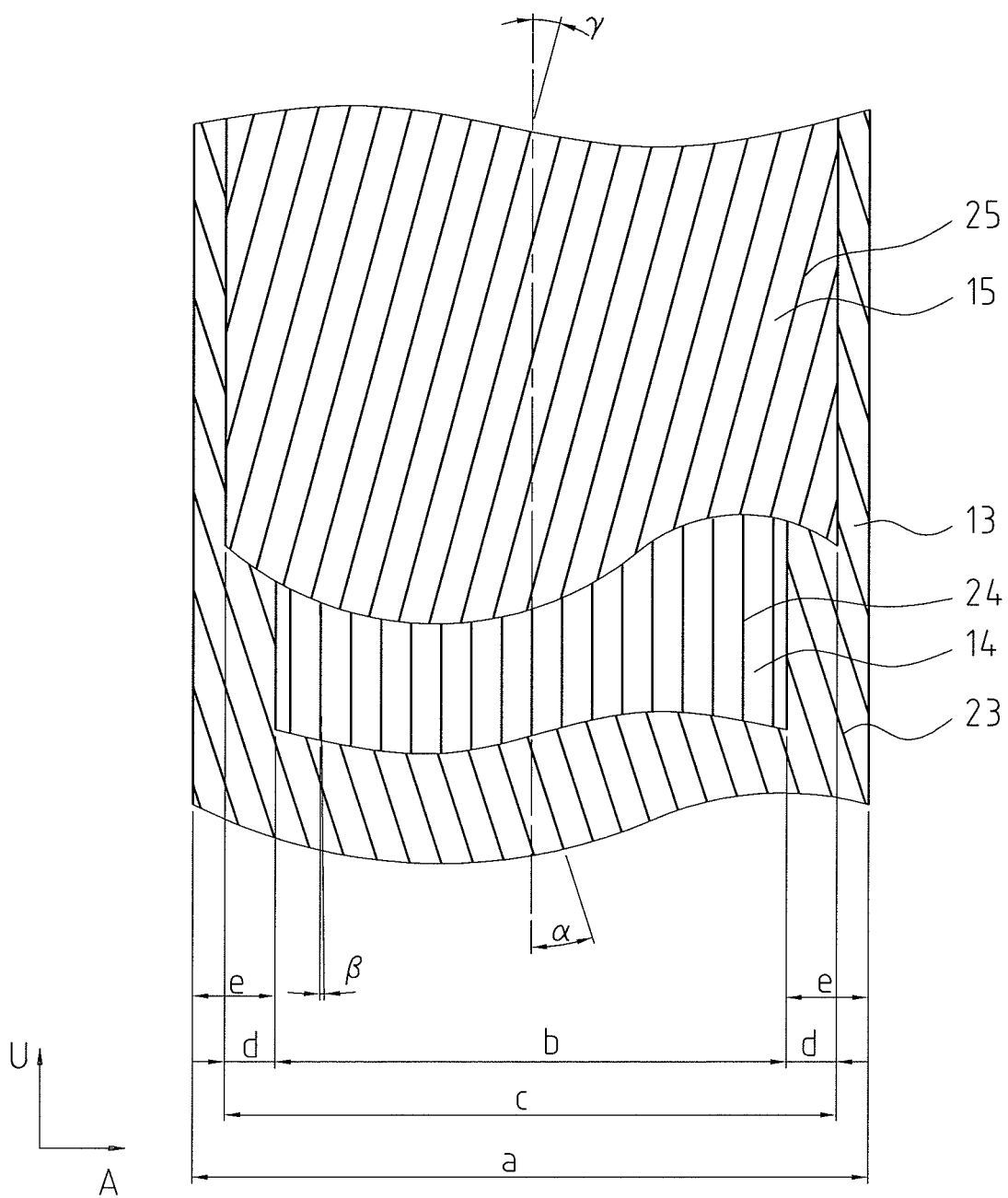
FIG. 2 shows a top view of the belt of FIG. 1 according to section II-II of FIG. 1, in which all the other components of the tire are not illustrated for simplification.

FIG. 1 and FIG. 2 show a utility vehicle pneumatic tire of a radial type of construction with two side walls 2 extending in a radial direction R of the vehicle tire with a crown region 3 formed axially between them. The side walls are in this case designed, at their end of extent pointing radially inward, with a bead region 1, in which is formed a bead core 4 of known type which is resistant to tensile force in the circumferential direction U and extends over the circumference of the tire in a circumferential direction. The bead cores 4 are designed in a known way to be wound from wire extending in the circumferential direction U of the vehicle pneumatic tire and embedded in rubber. An apex (bead filler) 6 of triangular cross section, made from hard rubber material, is formed in the conventional way on the bead cores 4. The vehicle pneumatic tire is designed with a carcass 5 which, starting from the bead core 4 formed in the left bead region 1 of the vehicle pneumatic tire, extends in the radial direction R of the vehicle pneumatic tire outward through the left side wall 2 as far as the crown region 3 and, in the crown region 3, in the axial direction A of the vehicle pneumatic tire as far as the right side wall 2 and, in the right side wall 2 of the vehicle pneumatic tire, radially inward as far as the bead core 4 formed in the bead region 1 of the right side wall 2. The carcass is designed in each of the two bead regions 1 to extend along the axial inner side of the bead core 4 as far as the radial inner side of the respective bead core 4, then, in prolongation of the axial direction, along the radial inner side of the bead core 4 as far as the axial outer side of the bead core 4 and then, in prolongation on the axial outer side of the bead core 4, as a wrap-around part 7 radially outward. The carcass 5 extends with its wrap-around part 7 along the axial outer side of the apex 6 and ends on the axial outer side of the apex 7. The carcass is formed in a known way, not illustrated in any more detail, from a carcass ply extending in the circumferential direction U over the entire circumference of the vehicle pneumatic tire and having parallel cords, for example steel cords, which are embedded in rubber and which extend in the region of the side walls 2 essentially in the radial direction R and in the crown region essentially in the axial direction A. On that side of the carcass 5 which points toward the tire inner side, an inner layer 12 made from known, especially air-impermeable rubber material extends from the left bead region 1 as far as the right bead region 1. In each case an additional bead reinforcer strip 8, which extends over the entire circumference of the vehicle pneumatic tire, is formed in the bead region 1 on that side of the carcass 5 which points away from the bead core 4. The bead reinforcer strip 8 is, for example, a material strip made from parallel strengtheners of textile or metallic type and embedded in rubber.

In the region of the tire crown 3, a belt 9 extending over the entire circumference of the vehicle pneumatic tire in circumferential direction U and in the axial direction A from the left tire shoulder as far as the right tire shoulder is formed in the radial direction R of the vehicle pneumatic tire outside the carcass 5 on the carcass 5 and is formed from three belt plies 13, 14 and 15 arranged one above the other and so as to lie one on the other in the radial direction R. A profiled running strip 10 of known type, which completely covers the belt 9, and which extends over the entire circumference of the vehicle pneumatic tire in the circumferential direction U and in the axial direction A from the left tire shoulder as far as the right tire shoulder is formed radially outside the belt 9 on the belt 9. A side wall rubber strip 11 is formed in a known way in the region of the tire side walls 2 on that side of the carcass 5 pointing axially away from the tire and extends in the radial direction R from the bead region 1 as far as the profiled running strip 10 in the crown region 3.

The radially inner belt ply 13 and the radially outer belt ply 15 are designed as working plies of the tire and in each case extend in the circumferential direction U over the entire circumference of the vehicle pneumatic tire and in the axial direction A from the left tire shoulder as far as the right tire shoulder. The working ply 13 is formed from a ply of thread-like parallel strengtheners 23 which are embedded in rubber and which extend over the entire width a, measured in the axial direction A, of the belt ply 13 essentially in a straight line and form an inclination angle $\alpha$ to the circumferential direction U of $10° \leq \alpha \leq 45°$. The working ply 15 is formed from a ply of thread-like parallel strengtheners 25 which are embedded in rubber and which extend over the entire axial width c of the belt ply 15 essentially in a straight line and form an inclination angle $\gamma$ to the circumferential direction U of $10° \leq \gamma \leq 45°$. The inclination direction of the strengtheners 25 of the working plies 15 is designed, as seen along the circumferential direction U, in the opposite axial direction A to the inclination direction of the strengtheners 23 of the working ply 13. The third belt ply 14 formed between the two working plies 15 and 13 extends in the circumferential direction U over the entire circumference of the vehicle pneumatic tire and in the axial direction from the left tire shoulder to the right tire shoulder and is designed as a 0° ply. For this purpose, the belt ply 14 is formed from parallel thread-like strengtheners which are embedded in rubber and which extend in a straight line over the entire circumference of the vehicle pneumatic tire, at the same time forming an angle $\beta$ to the circumferential direction U of $0° \leq \beta \leq 5°$, and are therefore oriented essentially in the circumferential direction U of the vehicle pneumatic tire. All three belt plies 13, 14 and 15 extend on both axial sides in each case into a position in the respective tire shoulder which lies axially outside the ground contact surface, illustrated by the axial width $T_A$ of the ground contact surface. The belt ply 14 is over its entire axial extent in direct touch contact both with the working ply 13 arranged below it and with the working ply 15 arranged above it.

The 0° ply 14 extends in the axial direction A over an axial width b, the lower working ply 13 extends in the axial direction A over an axial width a and the upper working ply 15 extends in the axial direction A over an axial width c in the tire, with a>c>b. In this case, on both axial sides of the 0° ply 14, the inner working ply 13 extends by an axial length of extent e beyond the axial position of the respective belt margin of the 0° ply 14. The outer working ply 15 likewise extends in each of the two axial directions by an axial length of extent d beyond the axial position of the respective belt margin of the 0° ply 14. What applies to the lengths of extent e and d of this overhang is e>d. The dimension d is in this case designed to be d≥10 mm. In the exemplary embodiment, the dimension e is designed to be e≤60 mm. The two working plies 13 and 15 also do not touch one another in the region of the overhang.

The strengtheners 23 and 25 of the two working plies 13 and 15 are steel cords of known type which, when subjected to tensile load, have a breaking force F of F>2500 N and, under 10% of the breaking force, an extension D of $0.28\% \leq D \leq 0.32\%$. Such steel cords are, for example, steel cords of type 3+8×0.35 HT with a breaking force F=3000 N and with an extension D of D=3.0% under 10% of the breaking force. The values are determined by way of the BISFA E6 standard test method for steel cords.

In one version, the strengtheners 24 are steel cords of known type. In another version, the strengtheners 24 are steel cords which are designed in a known way as high-elongation cord (HE cord). Highly stretchable high-elongation cords of this type have a modulus of elasticity under an extension of between 0% and 2% which is lower than its modulus of elasticity under an extension of more than 2%.

In an exemplary embodiment, β is selected equal to 1°, a equal to 20°, γ equal to 20°, d equal to 11 mm and e equal to 15 mm.

In an alternative version, not illustrated, of the versions mentioned above, in each case the inclination angle α of the strengtheners 23 of the inner working ply 13 is designed to be greater than the inclination angle γ of the strengtheners 25 of the outer working ply 15.

In an alternative version, not illustrated, of the versions mentioned above, in each case the inclination angle α of the strengtheners 23 of the inner working ply 13 is designed to be lower than the inclination angle γ of the strengtheners 25 of the outer working ply 15.

Figure 3:
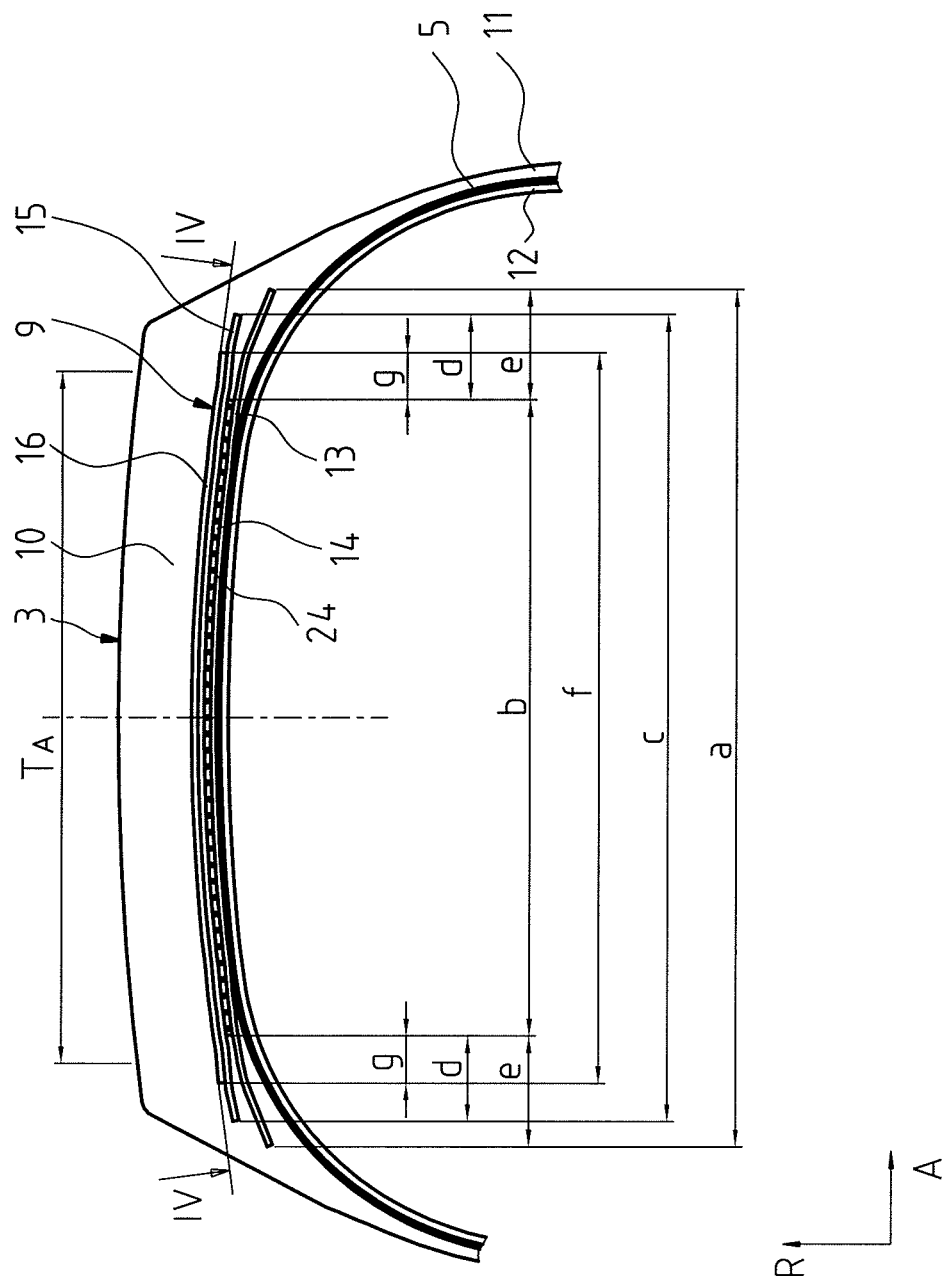
FIG. 3 shows, as a detail, a cross-sectional illustration of a vehicle pneumatic tire similar to the illustration of FIG. 1 with an alternative belt design.
Figure 4:
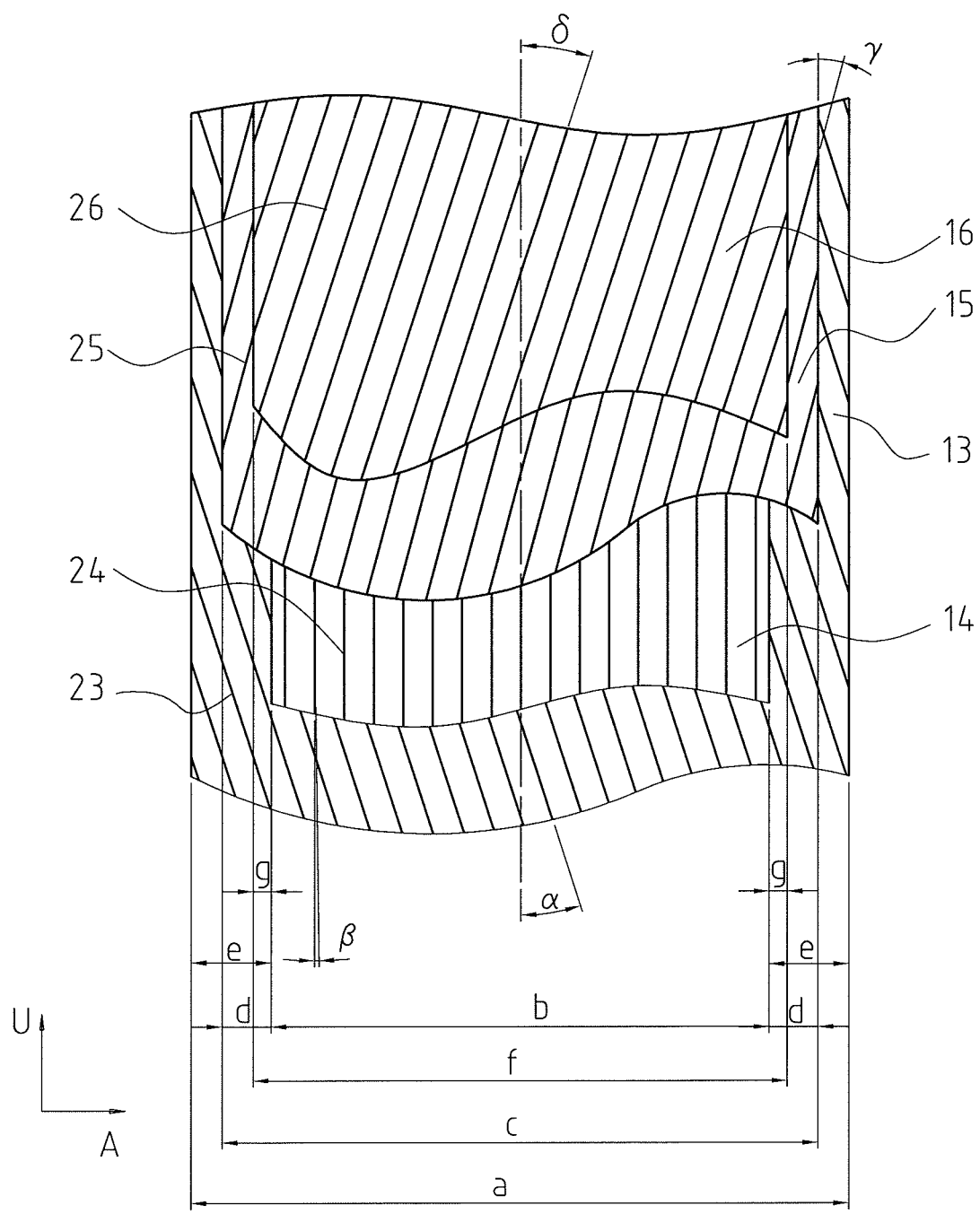
FIG. 4 shows a top view of the belt of FIG. 3 according to section IV-IV of FIG. 3, in which all the other components of the tire are not illustrated for simplification.

FIG. 3 and FIG. 4 show a further alternative version in which the belt 9, in addition to the belt plies 13, 14 and 15 illustrated in FIG. 1 and FIG. 2, is designed on the radial outer side of the outer working ply 15 with an additional belt ply 16 which extends in the circumferential direction U over the entire circumference of the vehicle pneumatic tire and in the axial direction A of the vehicle pneumatic tire from the left tire shoulder as far as the right tire shoulder. The belt ply 16 is formed from a ply of thread-like parallel strengtheners 26 which are embedded in rubber and which extend over the entire axial width F of the belt ply 16 essentially in a straight line and form an inclination angle δ to the circumferential direction U of $15° \leq \delta \leq 45°$. The belt ply 16 extends, over its entire axial extent, in direct touch contact with the working ply 15 and ends in the axial direction A, at each of its two belt ply margins, in an axial position between the nearest belt ply margin of the 0° ply 14 and the nearest belt ply margin of the radially outer working ply 15 at the axial distance g from the belt ply margin of the 0° ply 14, with g<d. The width f is the dimension of the axial extent of the additional belt ply 16 with b<f<c<a.

In one exemplary embodiment, the strengtheners 26 of the belt ply 16 are designed with the same inclination direction as the strengtheners 25 of the working ply 15.

The strengtheners 26 are steel cords of known type.

In another version, not illustrated, the additional belt ply 16 is designed as a 0° ply and the inclination angle δ of its strengtheners 26 extending over the entire circumference of the vehicle pneumatic tire is designed at $0° \leq \delta \leq 5°$. If the additional working ply 16 is designed as a 0° ply, the strengtheners 26 are in one version steel cords of known type. In another version, the strengtheners 26 of the working ply 16 designed as a 0° ply are steel cords which are designed in a known way as high-elongation cord (HE cord). Highly stretchable high-elongation cords of this type have a modulus of elasticity under an extension of between 0% and 2% which is lower than their modulus of elasticity under an extension of more than 2%.

Figure 5:
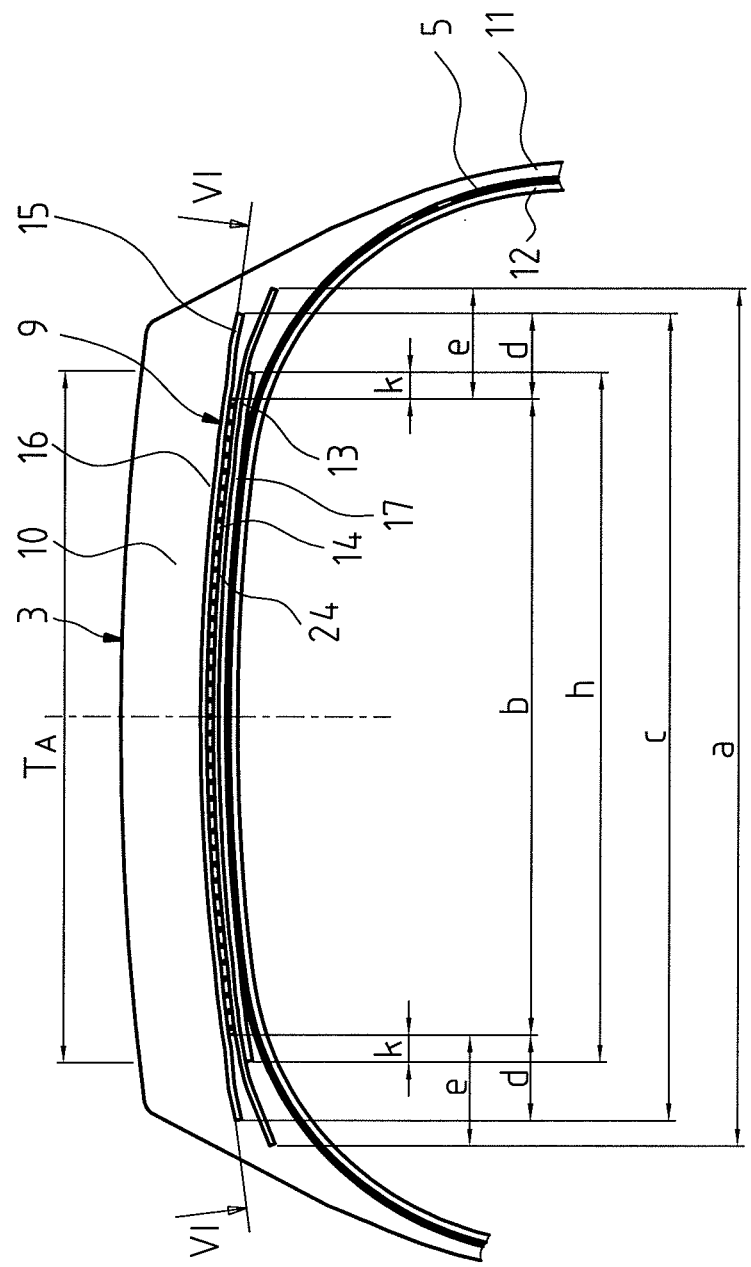
FIG. 5 shows, as a detail, a cross-sectional illustration of a vehicle pneumatic tire similar to the illustration of FIG. 1 with a further alternative design of the belt.
Figure 6:
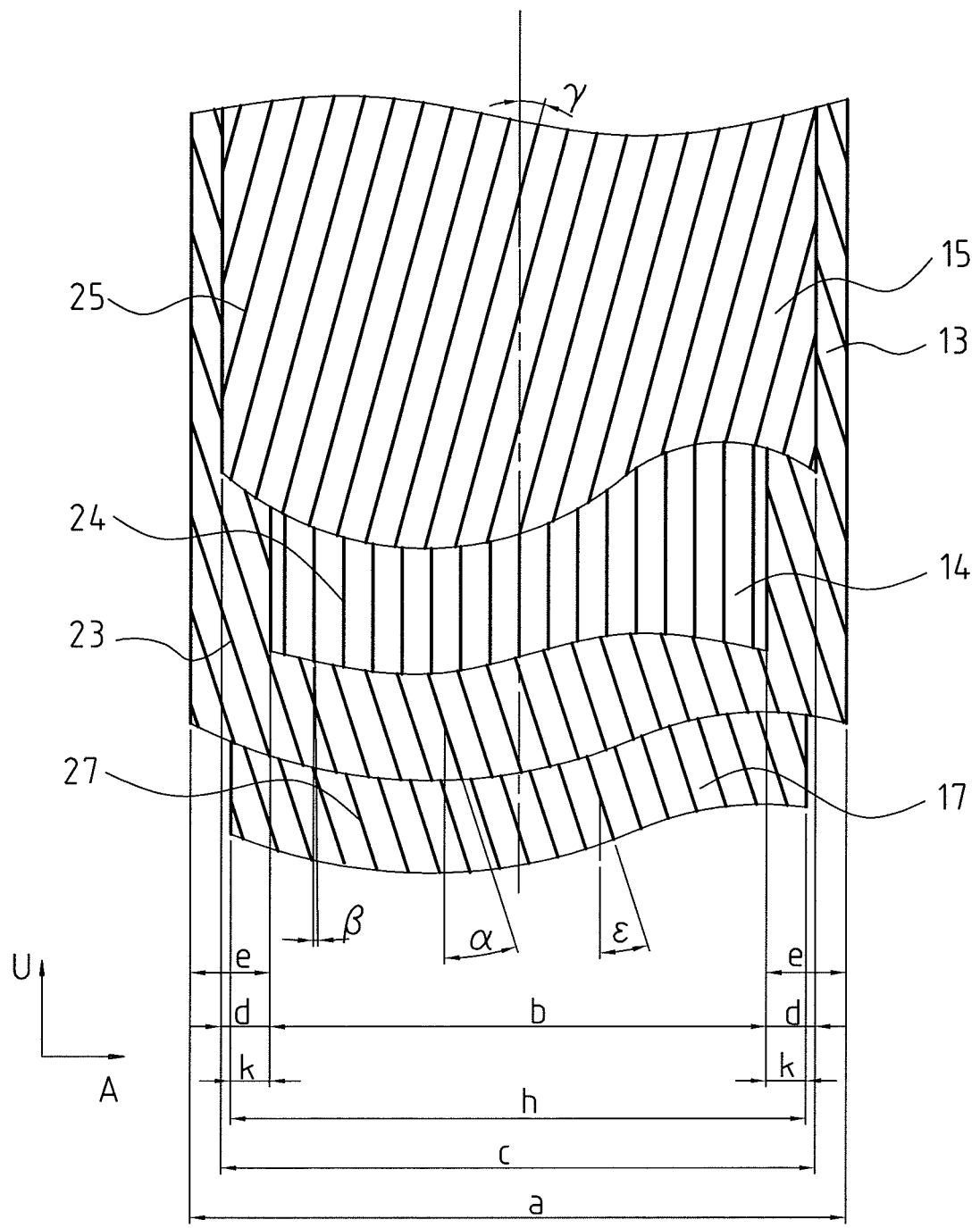
FIG. 6 shows a top view of the belt of FIG. 5 according to section VI-VI of FIG. 5, in which all the other components of the tire are not illustrated for simplification.

FIG. 5 and FIG. 6 show a further alternative exemplary embodiment in which, contrary to the exemplary embodiments illustrated and explained in FIG. 1 and FIG. 2, the belt 9 is additionally designed with a belt ply 17 which is arranged in a radial position between the radially inner working ply 13 and the carcass 5 and which extends in the circumferential direction U over the entire circumference of the vehicle pneumatic tire and in the axial direction A of the vehicle pneumatic tire from the left tire shoulder as far as the right tire shoulder. The belt ply 17 is formed from a ply of thread-like parallel strengtheners 27 which are embedded in rubber and which extend over the entire axial width h of the belt ply 17 essentially in a straight line and form an inclination angle ϵ to the circumferential direction U of $45° \leq \epsilon \leq 90°$, for example of ϵ=50°. The belt ply 17 extends, over its entire axial extent, in direct touch contact with the working ply 13 and ends in the axial direction A, at each of its two belt ply margins, in an axial position between the nearest belt ply margin of the 0° ply 14 and the nearest belt ply margin of the radially outer belt ply working ply 15 at the axial distance k from the belt ply margin of the 0° ply 14, with k<d<e. The width h is the dimension of the axial extent of the additional belt ply 17 with b<h<c<a.

In one exemplary embodiment, the strengtheners 27 of the belt ply 17 are designed with the same inclination direction as the strengtheners 23 of the radially inner working ply 13.

The strengtheners 27 are steel cords of known type.

In further alternative versions, not illustrated, the additional inner belt ply 17 illustrated in connection with FIG. 5 and FIG. 6 is also formed in the versions with an additional belt ply 16 which are illustrated in connection with FIG. 3 and FIG. 4. In this case, the belt 9 is formed from a 5-ply arrangement with the belt plies 17, 13, 14, 15 and 16 arranged one above the other radial from inside radially outward.

LIST OF REFERENCE SYMBOLS

1 Bead region
2 Side wall
3 Crown region
4 Bead core
5 Carcass
6 Apex (core filler)
7 Carcass wrap-around
8 Bead reinforcement strip
9 Belt
10 Profiled running strip
11 Side wall rubber strip
12 Inner layer
13 Belt ply (working ply)
14 Belt ply (zero-degree ply)
15 Belt ply (working ply)
16 Belt ply
17 Belt ply
23 Strengthener
24 Strengthener
25 Strengthener
26 Strengthener
27 Strengthener

The invention claimed is:
1. A vehicle pneumatic tire comprising:
a carcass;
a belt arranged radially outside the carcass;
a profiled running strip arranged radially outside the belt;
the belt comprising at least three belt plies arranged so as to lie one on the other radially;
one of the at least three belt plies being a radially inner working ply having first parallel steel strengtheners embedded in rubber that are oriented at an angle "α" relative to a circumferential direction and satisfy: $10° \leq \alpha \leq 45°$;
another of the at least three belt plies being a radially outer working ply having second parallel steel strengtheners embedded in rubber that are oriented at an angle "γ" relative to the circumferential direction and satisfy: $10° \leq \gamma \leq 45°$;
the radially inner working ply having an axial length that is greater than an axial length of the radially outer working ply;
the angle "α" having an opposite axial inclination to the angle "γ"; and
still another of the at least three belt plies being arranged between the radially inner and outer working plies and having third parallel strengtheners embedded in rubber that are oriented at an angle "β" to the circumferential direction and satisfy: 0°≤β≤5°,
wherein the first and second parallel strengtheners have the following properties:
a breaking force F greater than 1800 N; and
at 10% of the breaking force F, an extension D satisfies 0.22%≤D≤0.4%.

2. The tire of claim 1, wherein the still other of the three belt plies has an axial length that is shorter than the axial length of the radially outer working ply.

3. The tire of claim 1, wherein the breaking force F is greater than 2500 N.

4. The tire of claim 1, wherein the extension D satisfies 0.28%≤D≤0.32%.

5. The tire of claim 1, wherein the at least three belt plies further comprises a fourth belt ply arranged radially outside the radially outer working ply and having fourth parallel strengtheners embedded in rubber.

6. The tire of claim 5, wherein the fourth parallel steel strengtheners embedded in rubber are oriented at an angle "δ" relative to the circumferential direction and satisfies: 0°≤δ≤5°.

7. The tire of claim 5, wherein the fourth parallel steel strengtheners embedded in rubber are oriented at an angle "δ" relative to the circumferential direction and satisfies: 10°≤δ≤90°.

8. The tire of claim 1, wherein the at least three belt plies further comprises a fourth belt ply arranged radially inside the radially inner working ply and having fourth parallel strengtheners embedded in rubber.

9. The tire of claim 8, wherein the fourth parallel strengtheners embedded in rubber are oriented at an angle "ε" relative to the circumferential direction and satisfy: 45°≤ε≤90°.

10. The tire of claim 1, wherein the still other of the at least three belt plies being arranged between the radially inner and outer working plies has a shorter axial length than any of the radially inner and outer working plies.

11. The tire of claim 10, wherein the shorter axial length is at least 10 mm smaller.

12. The tire of claim 1, wherein the still other of the at least three belt plies being arranged between the radially inner and outer working plies has a shorter axial length than an axial length of the radially inner and outer working plies and opposite axial ends are respectively equally spaced from opposite axial ends of the radially inner and outer working plies.

13. The tire of claim 1, wherein the axial length of the radially outer working ply is greater than an axial length of a ground contact surface of the tire.

14. The tire of claim 13, wherein the radially outer working ply has opposite axial ends equally spaced from opposite axial ends of the radially inner working ply.

15. The tire of claim 1, wherein at least one of said first parallel strengtheners, said second parallel strengtheners, and said third parallel strengtheners are steel strengtheners.

16. The tire of claim 1, wherein said third parallel strengtheners are steel strengtheners.

17. The tire of claim 1, wherein said third parallel strengtheners are high-elongation steel cords.

18. The tire of claim 1, wherein the at least three belt plies further comprises a fourth belt ply arranged at least one of:
radially inside the radially inner working ply and having fourth parallel strengtheners embedded in rubber; and
radially outside the radially outer working ply and having fourth parallel strengtheners embedded in rubber.

19. The tire of claim 18, wherein the fourth parallel strengtheners are steel strengtheners.

20. The tire of claim 7, wherein the angle "δ" satisfies: 15°≤δ≤45°.

* * * * *